United States Patent
Downie et al.

(10) Patent No.: US 9,841,555 B2
(45) Date of Patent: Dec. 12, 2017

(54) OPTICAL TRANSMISSION SYSTEMS AND METHODS USING A QSM LARGE-EFFECTIVE-AREA OPTICAL FIBER

(71) Applicant: Corning Incorporated, Corning, NY (US)

(72) Inventors: John David Downie, Painted Post, NY (US); Ming-Jun Li, Horseheads, NY (US); Michal Mlejnek, Big Flats, NY (US); Ioannis Georgios Roudas, Big Flats, NY (US); William Allen Wood, Painted Post, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/862,681

(22) Filed: Sep. 23, 2015

(65) Prior Publication Data

US 2016/0154175 A1    Jun. 2, 2016

Related U.S. Application Data

(60) Provisional application No. 62/086,383, filed on Dec. 2, 2014.

(51) Int. Cl.
*H04B 10/00* (2013.01)
*H04B 10/12* (2006.01)
(Continued)

(52) U.S. Cl.
CPC ..... *G02B 6/02019* (2013.01); *G02B 6/02047* (2013.01); *G02B 6/28* (2013.01);
(Continued)

(58) Field of Classification Search
CPC ............ G02B 6/02019; G02B 6/02047; G02B 6/0281; G02B 6/0286; G02B 6/03633;
(Continued)

(56) References Cited

U.S. PATENT DOCUMENTS 6,327,403 B1    12/2001    Danziger et al.
6,418,256 B1    7/2002    Danziger et al.
(Continued)

FOREIGN PATENT DOCUMENTS

JP            05394344        1/2014
WO    WO 2009014623 A1 *   1/2009    ......... G02B 6/03644
(Continued)

OTHER PUBLICATIONS

I. Roudas, et al., "Comparison of analytical models for the nonlinear noise in dispersive coherent optical communications systems," IEEE Photonics Conference, paper MG3.4, Bellevue, WA, Sep. 2013.

(Continued)

*Primary Examiner* — Ken N Vanderpuye
*Assistant Examiner* — Abbas H Alagheband
(74) *Attorney, Agent, or Firm* — Robert L. Carlson (57) ABSTRACT

Optical transmission systems and methods are disclosed that utilize a QSM optical fiber with a large effective area and that supports only two modes, namely the fundamental mode and one higher-order mode. The optical transmission system includes a transmitter and a receiver optically coupled by an optical fiber link that includes at least one section of the QSM optical fiber. Transmission over optical fiber link gives rise to MPI, which is mitigated using a digital signal processor. The QSM optical fiber is designed to have an amount of DMA that allows for the digital signal processor to have reduced complexity as reflected by a reduced number of filter taps as compared to if the DMA were zero.

20 Claims, 9 Drawing Sheets

(51) Int. Cl.
| | |
|---|---|
| *G02B 6/036* | (2006.01) |
| *G02B 6/02* | (2006.01) |
| *H04B 10/25* | (2013.01) |
| *G02B 6/28* | (2006.01) |
| *G02B 6/028* | (2006.01) |
| *G02B 6/14* | (2006.01) |

(52) U.S. Cl.
CPC ....... *H04B 10/2504* (2013.01); *G02B 6/0281* (2013.01); *G02B 6/0286* (2013.01); *G02B 6/0288* (2013.01); *G02B 6/0365* (2013.01); *G02B 6/03611* (2013.01); *G02B 6/03633* (2013.01); *G02B 6/03666* (2013.01); *G02B 6/14* (2013.01)

(58) Field of Classification Search
CPC . G02B 6/0633; G02B 6/0366; H04B 10/2504
USPC ......... 398/144, 140, 142, 143; 385/127, 124
See application file for complete search history.

(56) References Cited

U.S. PATENT DOCUMENTS

| | | | | |
|---|---|---|---|---|
| 6,640,027 | B2* | 10/2003 | Kim | H04J 14/0221 385/126 |
| 6,839,484 | B2 | 1/2005 | White | |
| 6,888,991 | B2* | 5/2005 | White | G02B 6/02252 385/123 |
| 7,483,612 | B2 | 1/2009 | Digiovanni et al. | |
| 7,526,169 | B2* | 4/2009 | Bickham | G02B 6/3887 385/125 |
| 8,670,643 | B2* | 3/2014 | Li | G02B 6/02019 385/124 |
| 8,693,834 | B2* | 4/2014 | Bickham | G02B 6/0288 385/127 |
| 8,837,892 | B2* | 9/2014 | Bennett | H04B 10/2581 385/123 |
| 8,948,559 | B2* | 2/2015 | Gruner-Nielsen | G02B 6/0288 385/124 |
| 8,971,682 | B2* | 3/2015 | Evans | G02B 6/0288 385/11 |
| 9,128,237 | B2* | 9/2015 | Mukasa | G02B 6/02019 |
| 9,250,383 | B2* | 2/2016 | Gruner-Nielsen | G02B 6/0288 |
| 2003/0142940 | A1* | 7/2003 | Qi | G02B 6/02261 385/127 |
| 2003/0210877 | A1* | 11/2003 | Berkey | C03C 13/045 385/123 |
| 2004/0114892 | A1 | 6/2004 | Chiang et al. | |
| 2007/0002924 | A1* | 1/2007 | Hutchinson | H01S 5/141 372/98 |
| 2008/0124028 | A1* | 5/2008 | Bickham | G02B 6/3887 385/55 |
| 2008/0205839 | A1* | 8/2008 | Bickham | G02B 6/03688 385/127 |
| 2010/0014873 | A1* | 1/2010 | Bulow | H04B 10/6161 398/159 |
| 2011/0200339 | A1* | 8/2011 | Komaki | H04B 10/61 398/208 |
| 2013/0064554 | A1* | 3/2013 | Li | G02B 6/02009 398/143 |
| 2013/0071114 | A1* | 3/2013 | Bickham | G02B 6/0288 398/44 |
| 2013/0071115 | A1* | 3/2013 | Bennett | H04B 10/2581 398/44 |
| 2013/0216176 | A1 | 8/2013 | Li et al. | |
| 2013/0230290 | A1* | 9/2013 | Evans | G02B 6/0288 385/124 |
| 2014/0064686 | A1 | 3/2014 | Lars et al. | |
| 2014/0093205 | A1* | 4/2014 | Gruner-Nielsen | G02B 6/0288 385/43 |
| 2014/0161404 | A1* | 6/2014 | Fini | G02B 6/0288 385/126 |
| 2016/0091660 | A1* | 3/2016 | Li | G02B 6/02019 398/143 |

FOREIGN PATENT DOCUMENTS

| | | | |
|---|---|---|---|
| WO | WO 2013039939 A3 * | 5/2013 | ........... G02B 6/2817 |
| WO | 2014021894 | 2/2014 | |

OTHER PUBLICATIONS

Sui, et al. "256 Gb/s PM-16-QAM quasi-single-mode transmission over 2600 km using few-mode fiber with multi-path interference compensation" (OFC 2014 paper M3C.5).

S.J. Savory, "Digital filters for coherent optical receivers," Optics Express, vol. 16, No. 2, Jan. 21, 2008, pp. 804-818.

S.P. Jung, et al. "Quasi single-mode fiber for the cost effective implementation of broadband access networks" (OFC 2007, paper JThA2).

N. Kamikawa "A quasi-single mode optical fiber for long-haul transmission in severe bending environments" (IEEE PTL 6(3) 1994 pp. 428-430).

F. Yaman, et al. "10×112Gb/s PDM-QPSK transmission over 5032 km in few-mode fibers", Optics Express, 18(20), pp. 21342-21349, 2010.

F. Yaman, et al. "Long distance transmission in few-mode fibers", Optics Express, 18(12), pp. 13250-13257, 2010.

F. Yaman et al, "Impact of Modal Crosstalk and Multi-Path Interference on Few-Mode Fiber Transmission," OFC 2012, paper OTu1D.2 (2012).

J. D. Downie et al, "Transmission of 112 Gb/s PM-QPSK signals over up to 635 km of multimode optical fiber," Optics Express, vol. 19, B363-B369 (2011).

N. Bai et al, "Adaptive frequency-domain equalization for the transmission of the fundamental mode in a few-mode • fiber," Optics Express vol. 20, 204010-24017 (2012).

P. Siska, et al. "Coupling conditions for quasi-single mode optical fibers with different refractive index profile" (Proc. SPIE 8774, Optical Sensors 2013, 87741T (May 3, 2013)).

Jiang Sun et al., "Novel bending-resistant design of two-layer low-index trench fiber with parabolic-profile core", Optics Express, Jul. 28, 2014, vol. 22, No. 151, 18036-18043.

Alan Pak Tao Lau et al., "Long-haul Quasi-Single-Mode Transmission using Few-Mode Fiber with Multi-Path Interference Compensation", The 12th International Conference on Optical Internet Proceedings, 2014 IEEE, 978-14799-6507-6/14, FB3-1.

International Search Report, issued in connection with corresponding PCT application No. PCT/US2015/051589, dated Nov. 17, 2015.

* cited by examiner

OPTICAL TRANSMISSION SYSTEMS AND METHODS USING A QSM LARGE-EFFECTIVE-AREA OPTICAL FIBER

CROSS-REFERENCE TO RELATED APPLICATIONS

This application claims the benefit of priority under 35 U.S.C. §119 of U.S. Provisional Application Ser. No. 62/086,383, filed Dec. 2, 2014, which is related to U.S. Provisional Patent Application Ser. No. 62/056,784, filed on Sep. 29, 2014, and entitled "Quasi-single-mode optical fiber with a large effective area," which application is incorporated herein by reference.

FIELD

The present disclosure relates to optical transmission systems and optical fibers, and in particular relates to an optical transmission systems and methods that use a quasi-single-mode (QSM) large-effective-area optical fiber.

The entire disclosure of any publication or patent document mentioned herein is incorporated by reference, including the publication by I. Roudas, et al., "Comparison of analytical models for the nonlinear noise in dispersive coherent optical communications systems," IEEE Photonics Conference, paper MG3.4, Bellevue, Wash., September 2013; the publication by Sui et al., "256 Gb/s PM-16-QAM Quasi-Single-Mode Transmission over 2600 km using Few-Mode Fiber with Multi-Path Interference Compensation," OFC Conference, San Francisco, Calif., Mar. 9-13, 2014, Fiber Non-linearity Mitigation and Compensation (M3C) (ISBN: 978-1-55752-993-0); and the publication by S. J. Savory, "Digital filters for coherent optical receivers," Optics Express, Vol. 16, No. 2, Jan. 21, 2008, pp. 804-818.

BACKGROUND

Optical fibers are used for a variety of applications, especially in long-haul, high-speed optical communications systems. Optical fibers have an optical waveguide structure that acts to confine light to within a central region of the fiber. One of the many benefits of optical fibers is their ability to carry a large number of optical signals in different channels, which provides for high data transmission rates and a large bandwidth.

The increasing demand for bandwidth and higher data transmission rates has resulted in optical fibers carrying more channels and higher amounts of optical power. At some point, however, the optical power carried by the optical fiber can give rise to non-linear effects that distort the optical signals and reduce the transmission capacity of the optical communications system. Consequently, there is a practical limit to how much optical power an optical fiber can carry.

Because the optical power is confined by the waveguide structure of the optical fiber, the intensity determines the severity of non-linear effects in the optical fiber. The intensity is defined as the amount of optical power in the guided light divided by the (cross-sectional) area over which the guided light is distributed. This area is referred to in the art as the "effective area" $A_{eff}$ of the optical fiber. The effective area $A_{eff}$ is calculated from the electromagnetic field distribution of the light traveling within the optical fiber using techniques and methods known in the art.

It is well-known that optical fibers with large effective areas $A_{eff}$ are desirable in optical transmission systems because of their relatively high power threshold for nonlinear distortion impairments. The larger the effective area $A_{eff}$, the lower the intensity and thus the less non-linear effects. Because of this feature, an optical fiber with a large effective area $A_{eff}$ may be operated at higher optical powers, thereby increasing the optical signal-to-noise ratio (OSNR).

Unfortunately, the effective area $A_{eff}$ of optical fibers cannot simply be increased without bound. The conventional wisdom in the art is that an effective area $A_{eff}$ of about 150 μm² is the limit for a true single-mode fiber to maintain sufficient bend robustness, (i.e., reduced loss due to bending). In some cases, an effective area $A_{eff}$ of 150 μm² may in fact already be too large for some bending-loss requirements. However, the bending loss of an optical fiber can be reduced by increasing the mode confinement and hence the cutoff wavelength of the optical fiber associated with single-mode operation. Increasing the effective area $A_{eff}$ beyond present-day values would require raising the cutoff wavelength to be above the signal wavelength, thereby resulting in few-mode operation, which gives rise to undesirable optical transmission impairments such as modal dispersion and multipath interference (MPI).

Alternatives to increasing the effective area $A_{eff}$ of the optical fiber to reduce adverse non-linear effects include decreasing the effective nonlinear index $n_2$. The nonlinear physics of an optical fiber depends on the ratio $n_2/A_{eff}$. However, changing $n_2$ is difficult and the resulting effect is likely to be very small. Reducing the fiber attenuation is another alternative for better transmission performance. A lower fiber attenuation reduces the need for amplification and thus reduces the noise of the transmission link, which in turn reduces the required signal power for a given required OSNR. However, reducing the attenuation of the optical fiber impacts the optical fiber transmission system in a different way than by changing the effective area $A_{eff}$, so that these two parameters cannot be exactly traded off.

What is needed therefore is a more robust type of large-effective-area optical fiber for use in optical transmission systems, wherein the fiber reduces adverse non-linear effects while also having sufficiently small bending loss.

SUMMARY

Optical transmission systems and methods are disclosed that utilize a QSM optical fiber with a large effective area and that supports only two modes, namely the fundamental mode and one higher-order mode. The optical transmission system includes a transmitter and a receiver optically coupled by an optical fiber link that includes one or more sections of the QSM optical fiber. Transmission over the QSM optical fiber gives rise to MPI, which is mitigated using a digital signal processor. The QSM optical fiber is designed to have an amount of DMA that allows for the digital signal processor to have reduced complexity reflected by a reduced number of filter taps as compared to if the DMA were zero.

An aspect of the disclosure is an optical transmission system that includes: a QSM optical fiber configured to support a fundamental mode having effective area $A_{eff}$>170 μm² and an attenuation of no greater than 0.2 dB/km for a wavelength of 1530 nm, and to support a single higher-order mode having a differential modal attenuation (DMA) of at least 1.0 dB/km at a wavelength of 1530 nm; an optical transmitter optically coupled to the QSM optical fiber and configured to emit light that defines an optical signal that carries information; an optical receiver optically coupled to the optical transmitter by the QSM optical fiber and configured to receive the light emitted by the optical transmitter and transmitted over the QSM optical fiber in the fundamental mode and the single higher-order mode, wherein the transmission of the optical signals over the QSM optical fiber gives rise to multipath interference (MPI), and wherein the optical receiver generates an analog electrical signal representative of the received light; an analog-to-digital converter (ADC) electrically connected to the optical receiver and that converts the analog electrical signal into a corresponding digital electrical signal; and a digital signal processor electrically connected to the ADC and configured to receive and process the digital electrical signal to mitigate the MPI and generate a processed digital signal representative of the optical signal from the optical transmitter, wherein the digital signal processor includes a number $N_T$ of filter taps, and wherein the number $N_T$ of filter taps is reduced by at least 60% as compared to if the DMA of the QSM optical fiber were equal to zero.

Another aspect of the disclosure is an optical transmission system that includes: an optical fiber link having at least one section of quasi-single mode (QSM) optical fiber, wherein the at least one section of QSM fiber has: a core having a centerline and an outer edge, with a peak refractive index $n_0$ on the centerline and a refractive index $n_1$ at the outer edge; a cladding section surrounding the core, wherein the cladding section includes a first inner annular cladding region immediately adjacent the core; wherein the core and cladding section support a fundamental mode $LP_{01}$ and a higher-order mode $LP_{11}$ and define: i) for the fundamental mode $LP_{01}$: an effective area $A_{eff} > 170 \, \mu m^2$ and an attenuation of no greater than 0.2 dB/km for a wavelength of 1530 nm; ii) for the higher-order mode $LP_{11}$: a differential modal attenuation (DMA) of at least 1.0 dB/km for the wavelength of 1530 nm; and iii) a bending loss of BL<0.02 dB/turn for a wavelength of 1625 nm and for a bend diameter $D_B = 60$ mm; an optical transmitter configured to emit light that defines an optical signal that carries information; an optical receiver optically coupled to the optical transmitter by the at least one section of QSM optical fiber and configured to receive the light emitted by the optical transmitter and transmitted over the QSM optical fiber in the fundamental mode $LP_{01}$ and the higher-order mode $LP_{11}$ thereby giving rise to multipath interference (MPI), wherein the optical receiver generates an analog electrical signal from the received light; an analog-to-digital converter (ADC) electrically connected to the optical receiver and that converts the analog electrical signal into a corresponding digital electrical signal; and a digital signal processor electrically connected to the ADC and configured to receive and process the digital electrical signal to mitigate the MPI and generate a processed digital signal representative of the optical signal from the optical transmitter, wherein the digital signal processor includes a number $N_T$ of filter taps, and wherein the number $N_T$ of filter taps is reduced by at least 60% as compared to if the DMA of the QSM optical fiber were equal to zero.

Another aspect of the disclosure is an optical transmission method. The method includes: transmitting optical signals over an optical fiber link having at least one section of quasi-single mode (QSM) optical fiber configured to support a fundamental mode having an effective area $A_{eff} > 170 \, \mu m^2$ and an attenuation of no greater than 0.2 dB/km for a wavelength of 1530 nm, and to support a single higher-order mode having a differential modal attenuation (DMA) of at least 1.0 dB/km at a wavelength of 1530 nm, wherein the transmitting of the optical signals gives rise to multipath interference (MPI); receiving the transmitted optical signals with an optical receiver and generating in response analog electrical signals representative of the optical signals and including the MPI; converting the analog electrical signals to digital electrical signals; and processing the digital electrical signals with a digital signal processor that includes a number $N_T$ of filter taps configured to mitigate the MPI, wherein the number $N_T$ of filter taps is reduced by at least 60% as compared to if the DMA were zero.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Terminology

The term "relative refractive index," as used herein in connection with the multimode fibers and fiber cores discussed below, is defined as:

$$\Delta(r)=[n(r)^2-n_S^2)]/(2n_S^2)$$

where n(r) is the refractive index at radius r, unless otherwise specified and $n_S$ is the reference index. The relative refractive index is defined at the operating wavelength $\lambda_p$. In another aspect, $n_S$ is the index of fused silica ($SiO_2$). The maximum index of the index profile is denoted $n_0$, and in most cases, $n_0=n(0)$.

As used herein, the relative refractive index is represented by $\Delta$ and its values are given in units of "%," unless otherwise specified. In the discussion below, the reference index $n_{REF}$ is that for pure silica.

The term "dopant" as used herein generally refers to a substance that changes the relative refractive index of glass relative to pure (undoped) $SiO_2$ unless otherwise indicated.

The term "mode" is short for a guided mode or optical mode. A "multimode" optical fiber means an optical fiber designed to support the fundamental guided mode and at least one higher-order guided mode over a substantial length of the optical fiber, such as 2 meters or longer. A "single-mode" optical fiber is an optical fiber designed to support a fundamental guided mode only over a substantial length of the optical fiber, such as 2 meters or longer. A "few mode" or "few-moded" optical fiber is an optical fiber designed to support a fundamental guided mode and one or two higher-order modes over a substantial length of the optical fiber, such as 2 meters or longer. A "quasi-single mode" fiber is distinguished from a "few-mode" fiber in that the former seeks to use only the fundamental mode to carry information while the latter seeks to use all of the few modes to carry information.

The term "cutoff" is used herein refers to the cutoff wavelength $\lambda_c$ that defines the boundary for single-mode and multimode operation of an optical fiber, wherein single-mode operation of the fiber occurs for wavelengths $\lambda > \lambda_c$. The cutoff wavelength $\lambda_c$ as the term is used herein can be measured by the standard 2 m fiber cutoff test, FOTP-80 (EIA-TIA-455-80), to yield the "fiber cutoff wavelength," also known as the "2 m fiber cutoff" or "measured cutoff". The FOTP-80 standard test is performed to either strip out the higher order modes using a controlled amount of bending, or to normalize the spectral response of the fiber to that of a multimode fiber.

For examples of the QSM optical fiber disclosed herein, the cutoff wavelength $\lambda_c > 1600$ nm, or more preferably $\lambda_c > 1700$ nm, or more preferably $\lambda_c > 1750$ nm, or even more preferably $\lambda_c > 1800$ nm.

The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983). The light traveling in an optical fiber is usually described (approximately) in terms of combinations of LP (linear polarization) modes. The $LP_{0p}$ modes with p>0 have two polarization degrees of freedom and are two-fold degenerate. The $LP_{mp}$ modes with m>0, p>0 have both two polarization and two spatial degrees of freedom. They are four-fold degenerate. In the discussion herein, polarization degeneracies are not counted when designating the number of LP modes propagating in the fiber. For example, an optical fiber in which only the $LP_{01}$ mode propagates is a single-mode fiber, even though the $LP_{01}$ mode has two possible polarizations. A few-mode (or "few moded") optical fiber in which the $L_{01}$ and $LP_{11}$ modes propagate supports three spatial modes but nevertheless is referred herein as having two modes for ease of discussion.

As used herein, the "effective area" $A_{eff}$ of an optical fiber is the cross-sectional area of the optical fiber through which light is propagated and is defined as:

$$A_{eff} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. The effective area $A_{eff}$ is determined at a wavelength of 1550 nm, unless otherwise specified.

Macrobend performance of the example QSM optical fibers disclosed herein was determined according to FOTP-62 (IEC-60793-1-47) by wrapping 2 turns around a mandrel having a diameter $D_B$ (e.g., $D_B=60$ mm) and measuring the increase in attenuation due to the bending using an encircled flux (EF) launch condition.

Figure 1:
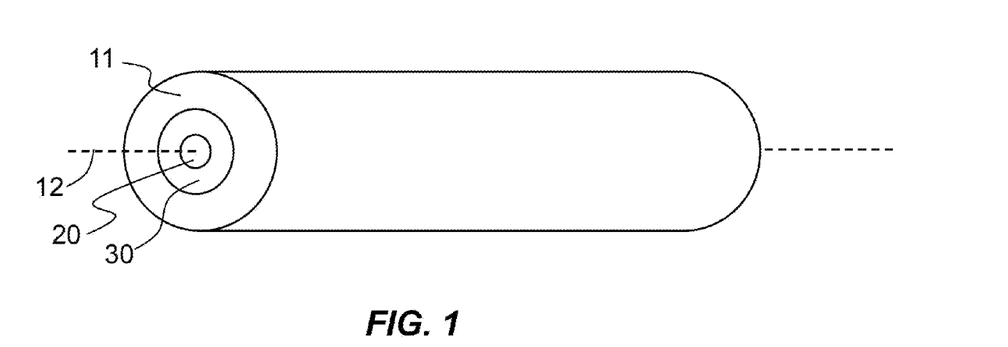
FIG. 1 is a front elevated view of a section of quasi-single-mode (QSM) fiber as disclosed herein.
Figure 4:
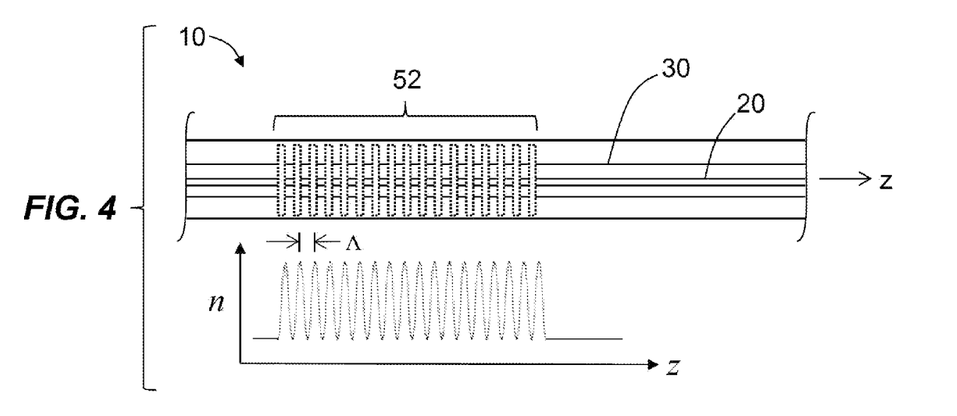
FIG. 4 is a close-up, cross-sectional view of the QSM optical fiber of FIG. 1, illustrating an example where the fiber includes an axial (longitudinal) refractive-index perturbation designed to provide substantial attenuation of the higher-order mode while not substantially attenuating the fundamental mode.

In the discussion below, any portion of the optical fiber that is not the core is considered part of the cladding, which can have multiple sections. In some of the Figures (e.g., FIG.

1 and FIG. 4), the cladding is shown has having a limited radial extent (e.g., out to radius $r_g$) for ease of illustration even though the cladding in principle extends beyond this limit.

The C-band is defined as the wavelength range from 1530 nm to 1565 nm; The L-band is defined as the wavelength range from 1565 nm to 1625 nm; and the C+L wavelength band is defined as the wavelength range from 1530 nm to 1625 nm.

The limits on any ranges cited herein are considered to be inclusive and thus to lie within the stated range, unless otherwise specified.

QSM Optical Fiber

FIG. 1 is an elevated view of a section of a QSM optical fiber 10 as disclosed herein. The QSM optical fiber 10 has a body 11 configured as described below and includes a centerline 12 that runs longitudinally down the center of the QSM optical fiber.

Figure 2:
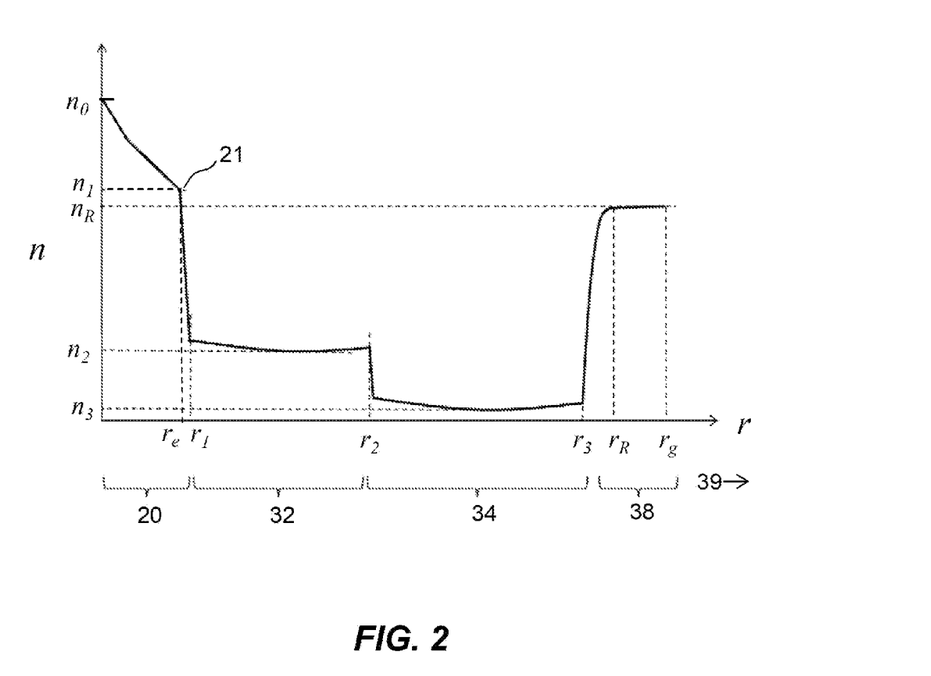
FIG. 2 is a plot of the refractive index n versus radius r that illustrates an example refractive index profile for an example of the QSM optical fiber of FIG. 1.

FIG. 2 is a plot of the refractive index n versus radius r of QSM optical fiber 10 as measured from centerline 12, illustrating an example refractive index configuration (profile) for the QSM optical fiber. The QSM optical fiber 10 has a central core ("core") 20 with a cladding section 30 surrounding the core. In an example, core 20 is made primarily silica and preferably alkali doped, e.g., potassium doped silica. In an example, core 20 also includes fluorine dopant.

The cladding section 30 includes a number of regions, namely a first inner annular cladding region or "inner cladding" 32, a second inner annular cladding region or "moat" 34 surrounding the inner cladding, and an annular outer cladding region or "ring" 38 surrounding moat 34. The shape of the core 20 is approximately triangular, but can vary from a step profile to an alpha profile. The core 20 has an outer edge 21 at a radius $r_e$, which can be considered the core radius, which in example is also equal to radius $r_1$. In one example, the core radius $r_e$ or $r_1 > 5$ μm, while in another example, $r_e$ or $r_1 > 7$ μm.

In an example, neither the core 20 nor the cladding section 30 includes germanium. In an example, the different regions of cladding section 30 are made of fluorine-doped silica. In an example, cladding section 30 is doped with fluorine while core 20 is doped with potassium.

The example refractive index profile of the example QSM optical fiber 10 of FIG. 2 can be described by nine fiber parameters (P): Five refractive indices $n_0$, $n_1$, $n_2$, $n_3$ and $n_R$, and four radii $r_1$, $r_2$, $r_3$ and $r_R$. The refractive index $n_0$ is the peak refractive index and occurs at r=0, i.e., on centerline 12 within core 20. The refractive index $n_1$ represents the refractive index at the interface between the core 20 and the adjacent inner cladding 32, i.e., at the core edge 21, which in an example is associated with radius $r_e$. The refractive index $n_2$ represents the minimum refractive index for inner cladding 32. The refractive index $n_3$ represents the minimum refractive index for moat 34. The refractive index $n_R$ represents the refractive index of ring 38.

In an example, the radius $r_1$ represents both the radius of core 20 and the inner radius of inner cladding 32, while the radius $r_2$ represents the outer radius of the inner cladding. The radius $r_3$ represents the outer radius of moat 34. The radius $r_R$ represents the inner radius of ring 38. The radius $r_g$ represents the radius where ring 38 ends and the glass coating 39 of refractive index $n_g$ that makes up the rest of the QSM optical fiber 10 begins.

Figure 5:
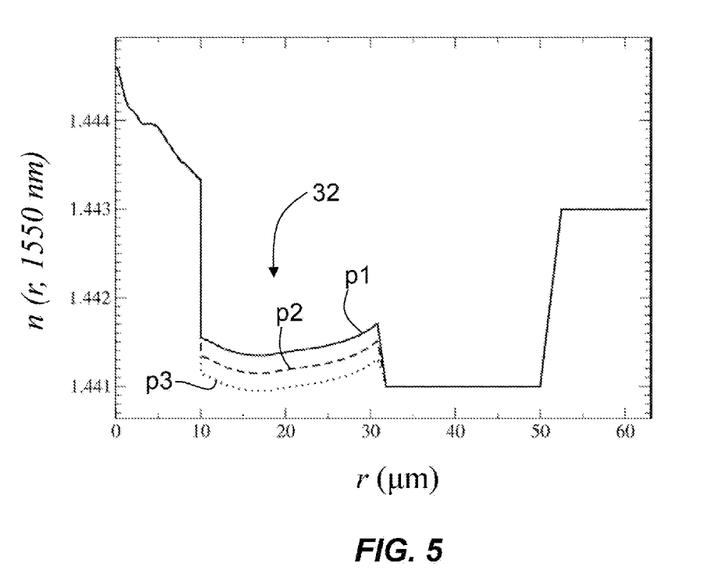
FIG. 5 is similar to FIG. 2 and illustrates in a single plot three different refractive index profiles p1, p2 and p3 for example QSM optical fibers, wherein the inner cladding for the different profiles has different depths.

In an example, the nine fiber parameters P are designed for a nominal glass radius $r_g$=62.5 μm. Small adjustments, to especially the cladding parameters ($r_3$, $n_3$) and ring parameters ($n_R$, $r_R$) may be required if the fiber glass radius $r_g$ is changed, which is optional for reducing bending loss. In FIG. 1, the core edge radius $r_e$ is slightly smaller than the inner cladding radius $r_1$ due to shortcomings in the refractive index measurement. In the plot of FIG. 5 discussed below, the transition from core 20 to inner cladding 32 is vertical so that $r_e = r_1$.

In an example embodiment of QSM optical fiber 10, $n_0 > n_1 > n_3 > n_2$. In another example, $n_1 > n_R$, while another example $n_1 \leq n_R$. Also in an example, $n_R > n_3 > n_2$.

Figure 3:
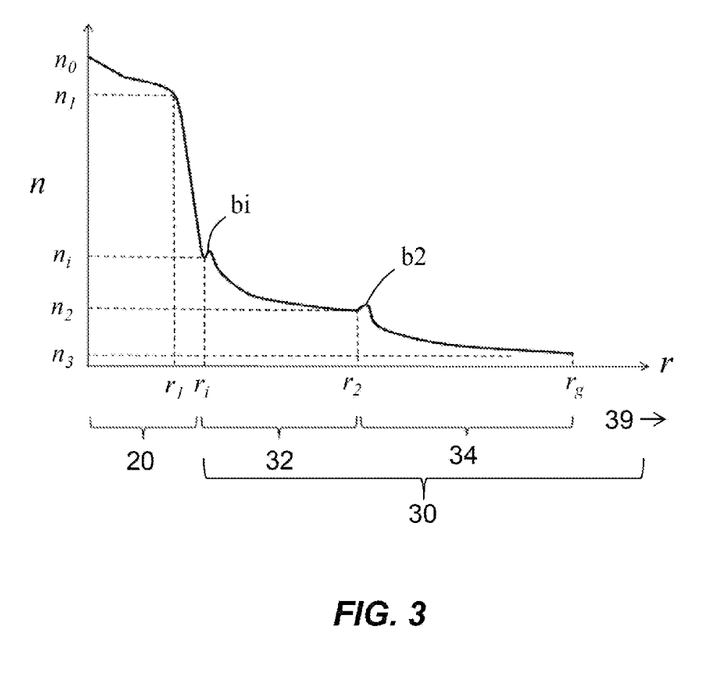
FIG. 3 is similar to FIG. 2 and illustrates an example refractive index profile for the QSM optical fiber that does not include the ring portion of the cladding section.

FIG. 3 is similar to FIG. 2 and illustrates an example refractive index profile for an example QSM optical fiber 10 wherein the cladding region 30 does not include the outer ring 38. For the "no-ring" profile of FIG. 3, the inner radius of inner cladding 32 is denoted $r_i$ and has an associated refractive index $n_i$. The shape of the core 20 is approximately step-like in the example, but can vary from a step profile to an alpha profile. The small bumps bi and b2 in the refractive index profile of FIG. 3 are features arising from the expected draw stress distribution and are not critical to the design. As noted above, the inner radius $r_i$ of inner cladding 32 can be equal to the radius $r_1$ of core 20.

The QSM optical fiber 10 disclosed herein has a relatively large effective area $A_{eff}$, which in one example is $A_{eff} > 150$ μm$^2$, while in another example is $A_{eff} > 170$ μm$^2$, while yet in another example is $A_{eff} > 200$ μm$^2$. The QSM optical fiber 10 is designed to be operated using only the fundamental mode $LP_{01}$ just as in single-mode fiber, while the one additional higher-order mode $LP_{11}$ is present but is not used. The one higher-order mode $LP_{11}$ (which is the only higher order mode supported by QSM optical fiber 10) can impair the transmission of optical signals traveling in the QSM optical fiber unless appropriate MP-compensating digital signal processing is applied to the received (transmitted) signal.

In an example, the fundamental mode $LP_{01}$ has a fundamental-mode effective index, the higher-order mode $LP_{11}$ has a higher-order-mode effective index, and wherein a difference $\Delta n_{eff}$ between the fundamental-mode effective index and the higher-order-mode effective index is $|\Delta n_{eff}| > 0.001$ at a wavelength of 1550 nm. In various examples, the fundamental mode $LP_{01}$ has an attenuation of no greater than 0.2 dB/km, or no greater than 0.18 dB/km, or no greater than 0.17 dB/km, or no greater than 0.165 dB/km.

Higher-Order-Mode Impairments

The main two impairments caused by the presence of the higher-order mode $LP_{11}$ in QSM optical fiber 10 are multi-path interference (MPI) and excess loss (EL). An aspect of the disclosure includes using QSM optical fiber 10 for optical signal transmission while electronically mitigating MPI of the optical signal using digital signal processing techniques that are known in the art and as described in greater detail. The electronic mitigation of MPI effects enables the deployment of QSM optical fiber 10 in an optical transmission system. To this end, in an example, the aforementioned parameters P of QSM optical fiber 10 are substantially optimized, while the excess loss EL, which cannot be compensated, is substantially minimized (e.g., made substantially zero). This avoids having the excess loss EL reduce the benefit of having a relatively large effective area $A_{eff}$ used to overcome detrimental non-linear effects, as explained above.

Because the higher-order mode $LP_{11}$ of QSM optical fiber 10 is undesirable and unused, the design and configuration of QSM optical fiber 10 is different than that for conventional few-mode optical fibers that seek to transmit information in the higher-order modes. In particular, because conventional few-mode optical fibers seek to utilize the information transmitted in the few higher-order modes, these modes need to have relatively low differential modal attenuation (DMA). As is explained in greater detail below, the QSM optical fiber 10 disclosed herein has relatively high DMA, i.e., the higher-order mode $LP_{11}$ is intentionally subjected to a relatively large attenuation to reduce the degree of optical transmission impairment caused by this higher-order mode.

Ideally, QSM optical fiber 10 would have a relatively large phase index difference between all supported modes to minimize mode-coupling, while at the same time having a small group index difference between all supported modes. This latter attribute minimizes the digital signal processing required to remove MPI artifacts from the received signal. Unfortunately, this is not possible in fibers with large effective area $A_{eff}$. Qualitatively, this is because, for any mode, the group index ($n_g$) is related to phase index (or "effective index" $n_e$) as follows:

$$n_g = n_e - \lambda \frac{dn_e}{d\lambda}$$

The difference in the group index $n_g$ between two modes is therefore given by:

$$\Delta n_g = \Delta n_e - \lambda \Delta \frac{dn_e}{d\lambda}$$

In the limit of very large effective area $A_{eff}$, the wavelength dispersion of all modes approaches that of the bulk glass, in which case the last term in the equation for $\Delta n_g$ vanishes so that $\Delta n_g \approx \Delta n_e$. Consequently, one cannot simultaneously have a low mode coupling (large $\Delta n_e$) and a small differential mode delay (DMD, small $\Delta n_g$).

In the QSM optical fiber 10 disclosed herein, low mode coupling is substantially preserved while, as noted above, the DMD is managed by intentionally designing the QSM optical fiber to have as much loss (i.e., a high DMA) as possible for the higher-order mode $LP_{11}$. A high DMA reduces the number $N_T$ of equalizer or filter taps (i.e., memory) required in the digital signal processor used for MPI compensation, thereby reducing system complexity, as described below. High DMA values also reduce the total MPI level, which may have an upper limit in terms of the efficacy of the MPI compensation digital signal processing.

In one example, the DMA for a wavelength of 1530 nm is DMA≥1.0 dB/km, while in another example, the DMA≥4.0 dB/km. Also in one example, the coupling coefficient CC between the fundamental mode $LP_{01}$ and the higher-order mode $LP_{11}$ at a wavelength of 1530 nm is CC<0.002 $km^{-1}$, while in another example, the coupling coefficient CC<0.001 $km^{-1}$.

One way to increase the DMA for the higher-order mode $LP_{11}$ is to shift the cutoff wavelength $\lambda_c$ to its lowest possible value consistent with macrobend requirements. Another way is to make the higher-order modes lossy in a mode-selective way. FIG. 4 is a close-up cross-sectional view of a portion of an example QSM optical fiber 10 that includes an axial (longitudinal) refractive-index perturbation 52. FIG. 4 includes a plot of refractive index n versus the axial distance z down the QSM optical fiber that illustrates an example form of the refractive-index perturbation having a constant period $\Lambda$. The refractive-index perturbation 52 is configured to increase the attenuation (DMA) of the higher-order mode $LP_{11}$ while not substantially increasing the attenuation of the fundamental mode $LP_{01}$. In an example, refractive-index perturbation 52 is in the form of a long-period grating that substantially matches a difference in the effective indices of the higher-order mode $LP_{11}$ and a radiative cladding mode at the operating wavelength, i.e., a period $\Lambda \approx 1/\Delta n$, where $\Delta n$ is the effective index difference between the higher-order mode $LP_{11}$ and the radiative cladding mode).

In an example, axial refractive-index perturbation 52 has a wavelength resonance and includes a non-constant (e.g., chirped) period $\Lambda$ that serves to widen the bandwidth of the resonance as compared to the constant period configuration. In an example, axial refractive-index perturbation 52 can be formed in QSM optical fiber 10 using known methods, such as laser irradiation. In an example, the axial refractive-index perturbation 52 can be formed as the fiber is being drawn, such as by irradiating the fiber with one or more lasers. In an example, the period $\Lambda$ of the refractive-index perturbation is chosen such that there is substantially no resonant coupling of the $LP_{01}$ and $LP_{11}$ modes in the C+L bands, and in an example at a wavelength of 1530 nm.

The so-called "Gaussian Noise (GN)" model of optical transmission posits that the launch-power-optimized system Q-factor scales with the effective area $A_{eff}$ as:

$$Q^2 \propto A_{eff}^{2/3}$$

so that increasing the effective area $A_{eff}$ from 150 to 175 $\mu m^2$ increases $Q^2$ by about 11% or 0.45 dB. Increasing the effective area $A_{eff}$ from 150 to 250 $\mu m^2$ increases $Q^2$ by 41% or 1.5 dB. An example simulation was carried out for an erbium-doped fiber-amplified (EDFA) polarization-multiplexed (PM)-16QAM (Quadrature Amplitude Modulation) optical transmission system having 80 channels, a 32 GHz (Nyquist) channel spacing, a 50 km span length, ideal (noise and distortion-free) transmitter and receivers and a QSM optical fiber 10 with span loss of 0.158 dB/km. The simulation shows that increasing the effective area $A_{eff}$ from 150 $\mu m^2$ to 250 $\mu m^2$ increases the reach at 11.25 dB from 3000 km to 4000 km. Hence, while a 1.5 dB increase in optimal $Q^2$ seems small, it can lead to a significant reach improvement.

This simulation suggests that with 50 km spans, increasing the effective area $A_{eff}$ from 150 $\mu m^2$ to 250 $\mu m^2$ and increasing the span loss from 0.158 dB/km to 0.215 dB/km produces no net change in $Q^2$. Hence the excess loss EL (i.e., the additional loss resulting from mode coupling above the intrinsic $LP_{01}$ attenuation) of just 0.057 dB/km can completely erase the advantage of the increase in effective area $A_{eff}$. An excess loss EL of even 0.01 dB/km can decrease the reach of QSM optical fiber 10 with an effective area $A_{eff}$=250 $\mu m^2$ by about 200 km. The advantage of large effective area fibers with an effective area $A_{eff}$ of less than 250 $\mu m^2$ would likewise be reduced.

It was found through modeling that conventional refractive index profiles cannot achieve sufficiently large DMA and effective areas $A_{eff}$ exceeding 175 $\mu m^2$ without also introducing excess macrobend loss. However, it was also found that the judicious addition of the ring 38 of increased refractive index $n_R$ relative to the refractive index $n_c$ of the outer cladding 34 can enhance the $LP_{11}$ mode coupling to the glass coating 39, thereby increasing the DMA without significantly impacting bend performance. In this regard, the index $n_R$ of the ring 38 must not exceed the effective index $n_{eff}$ of the fundamental mode. In an example, ring 38 includes at least one absorbing dopant that contribute to the attenuation of the higher-order mode $LP_{11}$. Examples of absorbing dopants include titanium or other transition metals. In another example, ring 38 does not include any absorbing dopants. In an example, ring 38 includes fluorine dopant, which is not an absorbing dopant.

Example QSM Optical Fibers

Table 1 below sets forth example QSM optical fiber parameters P for three examples of QSM optical fiber 10. In the Tables below, P stands for the given parameter, "MIN1" and "MAX1" stand for first example minimum and maximum values for the given parameter, "MIN2" and "MAX2" for second example minimum and maximum values for the given parameter, and "MIN3" and "MAX3" for third example minimum and maximum values for the given parameter. The parameters P in the following Tables are based on QSM optical fiber 10 having a nominal radius $r_g = 62.5$ μm.

TABLE 1

EXAMPLE 1

| P | MIN0 | MAX0 | MIN1 | MAX1 | MIN2 | MAX2 |
|---|---|---|---|---|---|---|
| $n_0$ | 1.4430 | 1.4450 | 1.4436 | 1.4448 | 1.4438 | 1.4447 |
| $n_1$ | 1.4430 | 1.4450 | 1.4430 | 1.4436 | 1.4432 | 1.4434 |
| $n_2$ | 1.4400 | 1.4430 | 1.4406 | 1.4419 | 1.4408 | 1.4415 |
| $n_3$ | 1.4390 | 1.4430 | 1.4406 | 1.4422 | 1.4408 | 1.4412 |
| $r_1$ [μm] | 5 | 15 | 7 | 12 | 8 | 11 |
| $r_m$ [μm] | 25 | 38 | 28 | 35 | 31 | 33 |
| $r_c$ [μm] | 40 | 62.5 | 45 | 55 | 48 | 52 |
| $r_R$ [μm] | 40 | 62.5 | 47 | 57 | 50 | 54 |

Table 2 below is an alternative representation of the refractive index data of Table 1. In Table 2, the refractive index change relative to pure silica is used. This refractive index change is represented by the relative refractive index Δ, which is given by $$\Delta = \frac{n^2 - n_s^2}{2n_s^2},$$

where n is the refractive index value from the tables above (at 1550 nm) and $n_S = 1.444374$, the refractive index of pure silica.

TABLE 2

EXAMPLE 1 USING Δ VALUES

| P | MIN | MAX | MIN1 | MAX1 | MIN2 | MAX2 |
|---|---|---|---|---|---|---|
| $\Delta_0$ | −9.5082E−04 | 4.3350E−04 | −5.3573E−04 | 2.9498E−04 | −3.9733E−04 | 2.2573E−04 |
| $\Delta_1$ | −9.5082E−04 | 4.3350E−04 | −9.5082E−04 | −5.3573E−04 | −8.1248E−04 | −6.7411E−04 |
| $\Delta_2$ | −3.0237E−03 | −9.5082E−04 | −2.6095E−03 | −1.7114E−03 | −2.4714E−03 | −1.9878E−03 |
| $\Delta_3$ | −3.7137E−03 | −9.5082E−04 | −2.6095E−03 | −1.5040E−03 | −2.4714E−03 | −2.1951E−03 |
| $r_1$ [μm] | 5 | 15 | 7 | 12 | 8 | 11 |
| $r_m$ [μm] | 25 | 38 | 28 | 35 | 31 | 33 |
| $r_c$ [μm] | 40 | 62.5 | 45 | 55 | 48 | 52 |
| $r_R$ [μm] | 40 | 62.5 | 47 | 57 | 50 | 54 |

The second example of QSM optical fiber 10 is set forth in Table 3 below and represents an example of the "no ring" configuration such as shown in FIG. 3.

TABLE 3

EXAMPLE (NO RING)

| P | MIN | MAX | MIN1 | MAX1 | MIN2 | MAX2 |
|---|---|---|---|---|---|---|
| $n_0$ | 1.4435 | 1.4445 | 1.4437 | 1.4443 | 1.4438 | 1.4442 |
| $n_1$ | 1.4430 | 1.4450 | 1.4427 | 1.4438 | 1.4430 | 1.4435 |
| $n_i$ | 1.4410 | 1.4420 | 1.4412 | 1.4418 | 1.4413 | 1.4417 |
| $n_2$ | 1.4397 | 1.4413 | 1.4400 | 1.4412 | 1.4402 | 1.4409 |
| $n_3$ | 1.4380 | 1.4410 | 1.4387 | 1.4405 | 1.4390 | 1.4402 |
| $r_1$ [μm] | 5 | 12 | 5 | 10 | 6 | 9 |
| $r_i$ [μm] | 6 | 13 | 7 | 12 | 7 | 11 |
| $r_2$ [μm] | 18 | 33 | 19 | 29 | 20 | 25 |

The third example of QSM optical fiber 10 is set forth in Table 4 below and represents another example of the "no ring" configuration.

TABLE 4

EXAMPLE 3 (NO RING)

| P | MIN | MAX | MIN1 | MAX1 | MIN2 | MAX2 |
|---|---|---|---|---|---|---|
| $n_0$ | 1.4435 | 1.4445 | 1.4437 | 1.4443 | 1.4438 | 1.4442 |
| $n_1$ | 1.4425 | 1.4435 | 1.4426 | 1.4433 | 1.4427 | 1.4432 |
| $n_i$ | 1.4410 | 1.4420 | 1.4412 | 1.4418 | 1.4405 | 1.4409 |
| $n_2$ | 1.4397 | 1.4413 | 1.4400 | 1.4412 | 1.4402 | 1.4409 |
| $n_3$ | 1.4380 | 1.4410 | 1.4387 | 1.4405 | 1.4390 | 1.4402 |
| $r_1$ [μm] | 6 | 14 | 6 | 12 | 7 | 10 |
| $r_i$ [μm] | 7 | 15 | 8 | 14 | 9 | 13 |
| $r_2$ [μm] | 25 | 35 | 20 | 34 | 25 | 30 |

QSM Properties of Example Profiles

Figure 6:
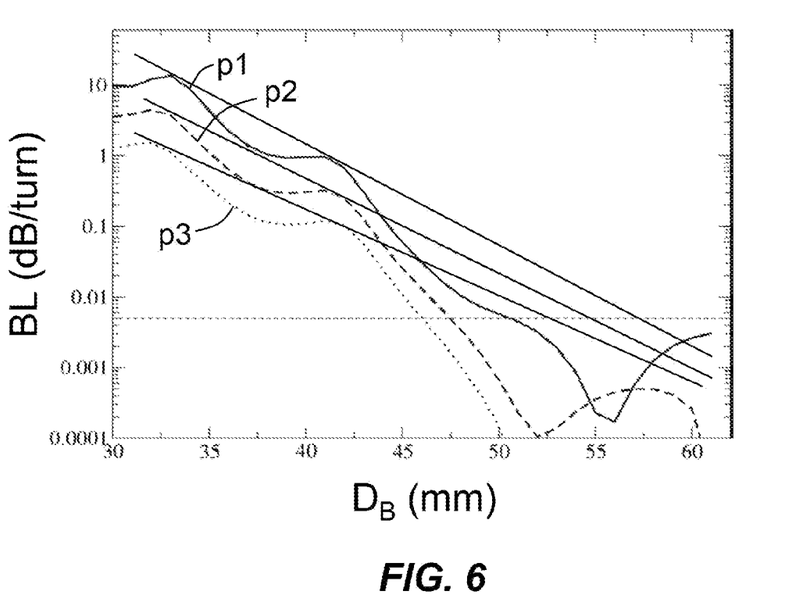
FIG. 6 is a plot of the bending loss BL (dB/turn) versus the bending diameter $D_B$ (mm) for the three refractive index profiles p1, p2 and p3 of FIG. 5.

FIG. 5 is similar to FIG. 2 and shows first, second and third example refractive index profiles p1, p2 and p3 (solid, dashed and dotted lines, respectively) for example QSM optical fibers 10, wherein the different index profiles have different depths for inner cladding 32. FIG. 6 is a plot of the predicted bend loss BL (dB/turn) versus bend diameter $D_B$ (mm) at a wavelength of 1625 nm as obtained using optical modeling. The three solid straight lines in FIG. 5 are approximate upper bounds for the example profiles p1, p2 and p3 based on fitting the oscillation peaks. All three example profiles p1, p2 and p3 yield a bending loss BL<5 mdB/turn at a bend diameter $D_B$ of 60 mm.

Figure 7:
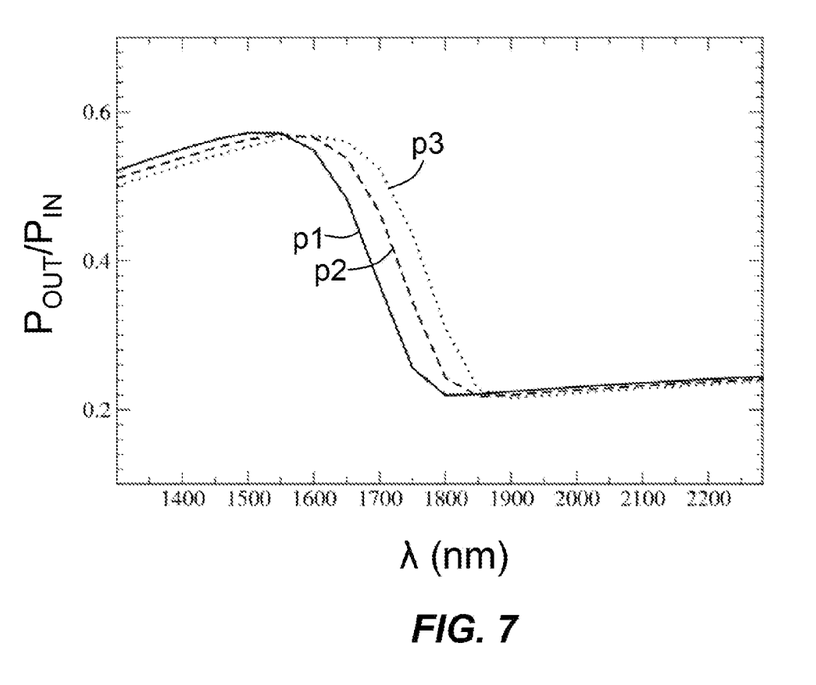
FIG. 7 is a plot of the ratio of the measured outputted optical power $P_{OUT}$ to the inputted optical power $P_{IN}$ ($P_{OUT}/P_{IN}$) versus the wavelength $\lambda$ (nm) for the three different refractive index profiles p1, p2 and p3 of FIG. 5, wherein the plot is used to calculate the cutoff wavelength $\lambda_c$ from multimode to single-mode operation.

FIG. 7 is a plot of the ratio of the measured outputted optical power $P_{OUT}$ to the inputted optical power $P_{IN}$ ($P_{OUT}/P_{IN}$) versus the wavelength λ (nm) for the three different refractive index profiles p1, p2 and p3 of FIG. 5, wherein the plot is used to calculate the cutoff wavelength $\lambda_c$ from multimode to single-mode operation.

Table 5 below summarizes the predicted optical properties of the three example profiles p1, p2 and p3 of FIG. 5. The values for the bending loss BL are obtained from the straight-line fits of FIG. 6 while the cut-off wavelengths $\lambda_c$ are estimated from the power trace plots of FIG. 7. The effective area $A_{eff}$ is measured in μm² at λ=1550 nm. The straight fiber $LP_{11}$ mode cutoff wavelength $\lambda_c$ is measured in nanometers (nm). The straight-fiber $LP_{11}$ mode radiative loss at 1550 nm is denoted RL and is measured in dB/km. The fundamental mode macro-bend loss BL is measured in dB/turn at $\lambda=1625$ nm and a bend diameter $D_B=60$ mm.

TABLE 5

PREDICTED OPTICAL PROPERTIES FOR 3 EXAMPLE PROFILES

| Profile | $A_{eff}$ [μm²] | $\lambda_c$ [nm] | RL [dB/km] | BL [dB/turn] |
|---|---|---|---|---|
| p1 | 237 | 1800 | 11.4 | $1.9 \times 10^{-3}$ |
| p2 | 232 | 1850 | 5.1 | $0.9 \times 10^{-3}$ |
| p3 | 227 | 1885 | 2.3 | $0.6 \times 10^{-3}$ |

Relationship Between DMA and $N_T$

Figure 8A:
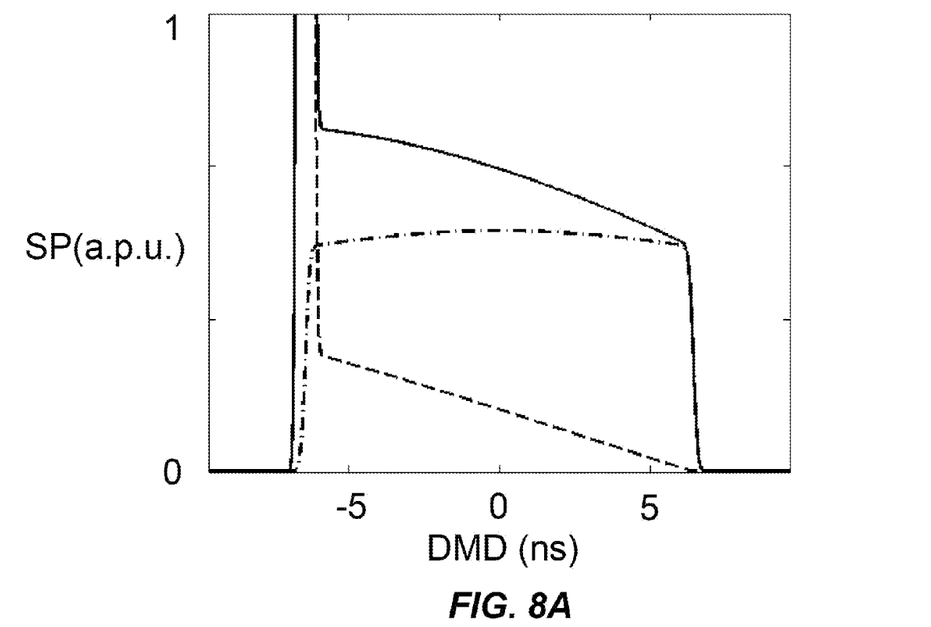
FIGS. 8A and 8B plot of the signal power distribution SP in arbitrary power units (a.p.u.) as a function of the differential mode delay or DMD (ns) in a two-mode ($LP_{01}$ and $LP_{11}$) QSM optical fiber for the case where there is negligible mean differential modal attenuation or DMA (FIG. 8A) and for the case where there is a high DMA (FIG. 8B), wherein the solid shows the total power, the dashed line shows the power in the fundamental mode $LP_{01}$, and the dashed-dotted line shows the power in the higher-order mode $LP_{11}$.
Figure 8B:
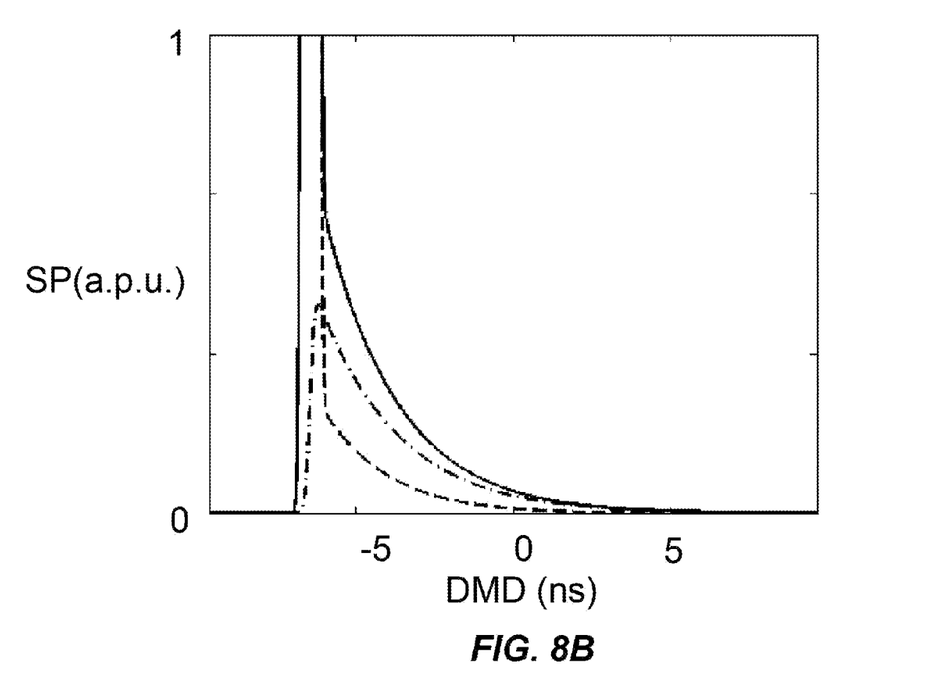

One of the advantages of QSM optical fiber 10 is that it reduces the number $N_T$ of filter taps ("taps") 136 (see FIG. 10) needed for the digital signal processor used for MPI compensation in an optical transmission system, discussed in greater detail below. FIGS. 8A and 8B plot the signal power distribution SP in arbitrary power units (a.p.u.) as a function of the DMD (ns) in a two-mode ($LP_{01}$ and $LP_{11}$) QSM optical fiber 10. The solid shows the total power; the dashed line shows the power in the fundamental mode $LP_{01}$; the dashed-dotted line shows the power in the higher-order mode $LP_{11}$.

In FIG. 8A, there is negligible mean DMA, while in FIG. 8B here is a high mean DMA. All other fiber parameters P were kept the same, and in both cases the signal was launched into the fundamental mode $LP_{01}$ only. The amount of significantly delayed contributions (the tail of the dashed black line) is decreased as the DMA increases. This enables use of a QSM optical fiber 10 with large DMA having a relatively large DMD with a digital signal processor having a reduced number $N_T$ of taps as compared to conventional MPI compensation for a fiber with zero or very low DMA.

The amount of significantly delayed contributions (the tail of the dashed black line) is decreased as the DMA increases. This enables use of a QSM optical fiber 10 having a relatively large DMD with a digital signal processor having a reduced number $N_T$ of taps as compared to conventional MPI compensation.

Figure 9A:
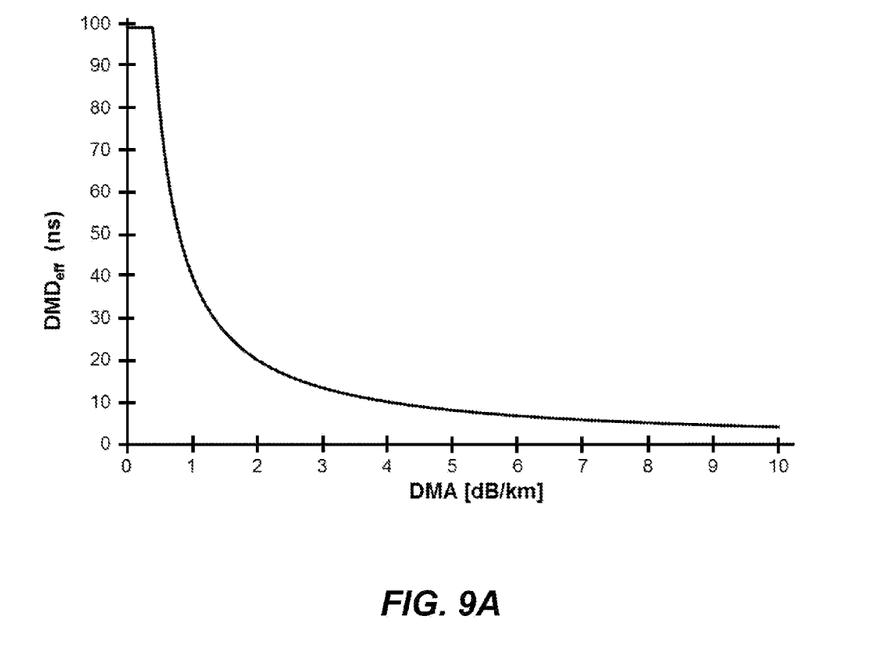
FIG. 9A is a plot of the effective DMD, denoted $DMD_{Eff}$ (in units of nanoseconds, ns) versus the DMA (dB/km) for an example optical transmission system that employs an example of the QSM optical fiber disclosed herein.
Figure 9B:
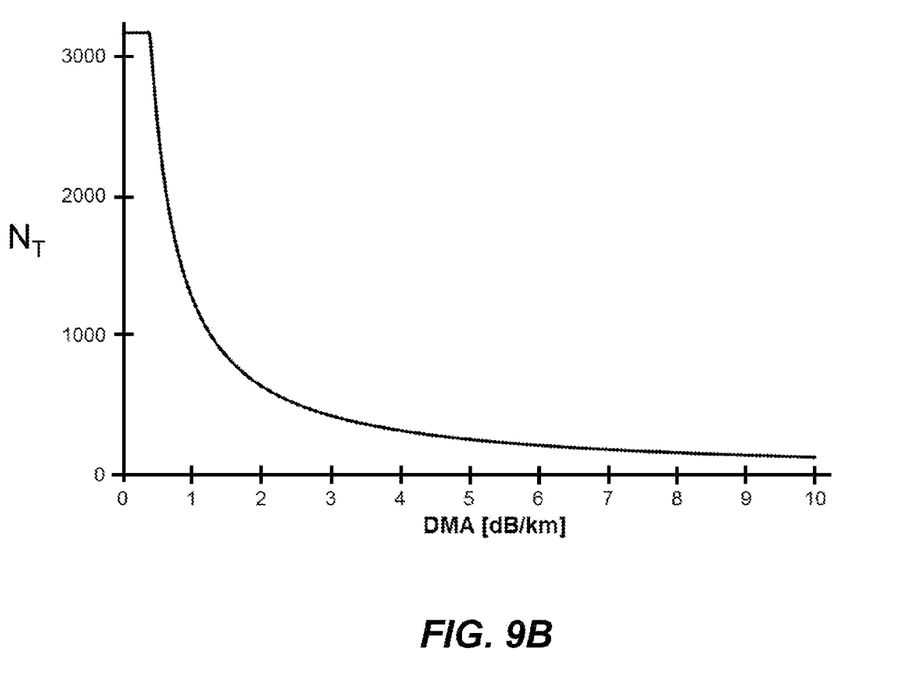
FIG. 9B is plot of the number $N_T$ of filter taps versus the DMA (dB/km) for an example optical transmission system that employs an example of the QSM optical fiber disclosed herein.

FIG. 9A is a plot the effective DMD, denoted $DMD_{Eff}$ (nanoseconds, ns) versus the DMA (dB/km) for an example optical transmission system that utilizes the QSM optical fiber 10 disclosed herein. FIG. 9B is similar to FIG. 9A but with the $DMD_{Eff}$ is expressed as the number $N_T$ of taps required in the signal processor, wherein each tap has duration of 31.25 ps. The effective DMD is defined as the time interval that includes 99.99% of the interfering pulse energy and represents the amount of time delay the digital signal processor needs to compensate for MPI.

Figure 9C:
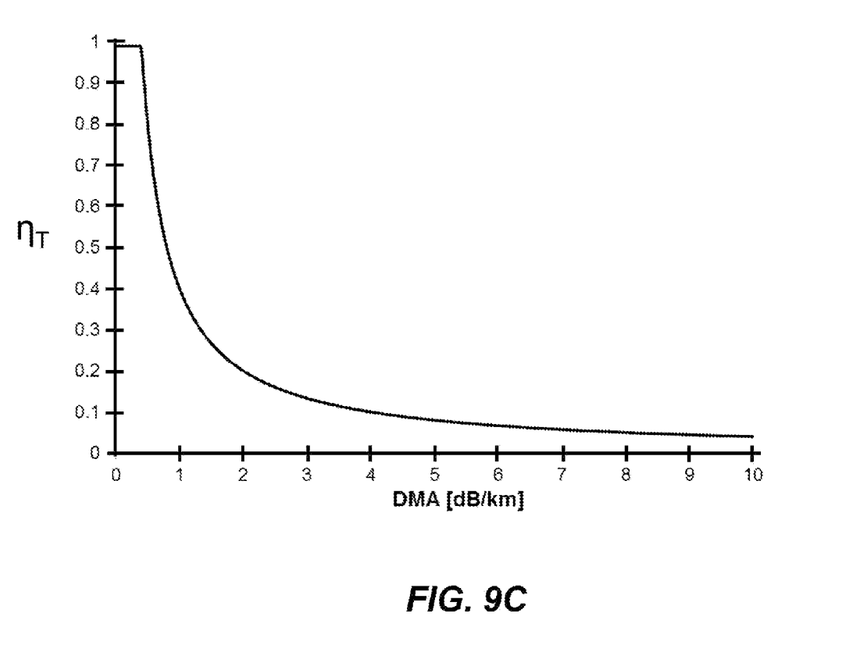
FIG. 9C is similar to FIG. 9B, with the number $N_T$ of filter taps replaced by normalized number $\eta_T$ of filter taps.

The calculations used to generate FIGS. 9A and 9B assume a DMD of 1 ns/km and a length L=100 km of QSM optical fiber 10. FIG. 9C plots the normalized maximum number $\eta_T$ of taps relative to the case with zero DMA. The reduction of the maximum number $\eta_T$ of taps required with increasing DMA corresponds directly to a reduction of the signal processing complexity.

The plots of FIGS. 9A, 9B, and 9C show the effect of the non-zero DMA on the number $N_T$ of taps needed to compensate for the optical transmission impairment of the information-carrying optical signal traveling in the fundamental mode. The calculation of the required number $N_T$ (or $\eta_T$) of taps is approximate. The calculation is based on a mean MPI compensation, so the results can be considered as establishing a lower bound on the number $N_T$ of taps.

Table 6 below sets forth the normalized number $\eta_T$ of taps required for selected DMA values, relative to a fiber with DMA=0 dB/km. In various examples, the DMA is equal to or greater than 1 dB/km, or equal to or greater than 2 dB/km, or equal to or greater than 3 dB/km, or equal to or greater than 4 dB/km. Also included in Table 6 is a column denoting the % reduction in the number of taps ("% tap reduction") as compared to the case where the DMD is equal to zero.

TABLE 6

EFFECT OF DMA ON SIGNAL PROCESSOR COMPLEXITY

| DMA (dB/km) | $\eta_T$ | % tap reduction |
|---|---|---|
| 1 | 0.40 | 60% |
| 2 | 0.20 | 80% |
| 3 | 0.13 | 87% |
| 4 | 0.10 | 90% |

Optical Transmission System with QSM Optical Fiber

Figure 10:
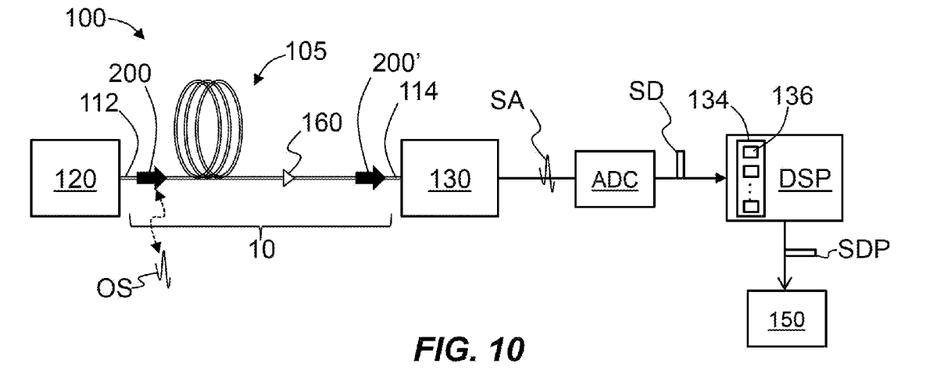
FIG. 10 is a schematic diagram of an optical transmission system that employs the QSM optical fiber as disclosed herein along with MPI compensation to recover the signal that travels in the fundamental mode of the QSM optical fiber.

FIG. 10 is a schematic diagram of an example optical transmission system ("system") 100 that employs the QSM optical fiber 10 as disclosed herein. System 100 includes an optical transmitter 110, an optical fiber link 105 that includes at least one section of QSM optical fiber 10, an optical receiver 130, an analog-to-digital converter ADC electrically connected to the optical receiver and a digital signal processor DSP electrically connected to the analog-to-digital converter. Also optionally included in system 100 is a decision circuit 150 electrically connected to the digital signal processor DSP. The optical fiber link 105 is operably disposed to optically connect optical transmitter 110 to optical receiver 130.

The digital signal processor DSP includes an MPI mitigation system 134 that in example includes a plurality or number $N_T$ of taps 136. System 10 and in particular MPI mitigation system 134 is configured to perform electronic equalization of optical transmission impairments to the optical signal using methods known in the art. In one example, MPI mitigation system 134 includes four finite impulse response (FIR) filters in a butterfly structure (not shown), wherein each filter has a number $N_T$ of taps 136, which are recursively adjusted based on a least-mean-square (LMS) algorithm.

In the example system 100 shown in FIG. 10, QSM optical fiber 10 includes an input end 112 optically connected to optical transmitter 110 and an output end 114 optically connected to optical receiver 130, thereby establishing an optical connection between the optical transmitter and the optical receiver. In an example, QSM optical fiber 10 includes an amplifier 160, e.g., an EDFA.

Figure 11:
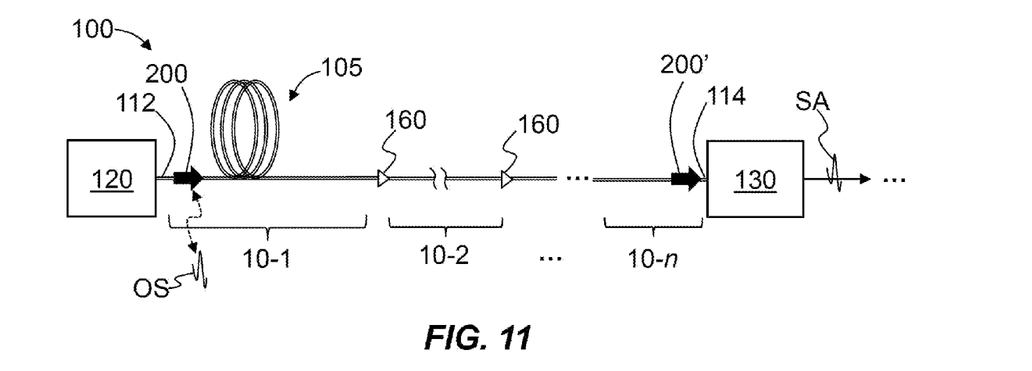
FIG. 11 is a close-up view of the front-end portion of the optical transmission system of FIG. 10 and illustrates an example embodiment wherein optical fiber link includes multiple sections of QSM optical fiber.

FIG. 11 is a close-up view of the front-end portion of system 100 and illustrates an example embodiment wherein optical fiber link 105 includes n sections 10-1, 10-2, ... 10-n of QSM optical fiber 10. As noted above, optical fiber link 105 can include two or more sections of optical fiber 10, and n can be any reasonable number consistent with the needs of system 10. In an example, optical fiber link 105 includes one or more amplifiers 160, which in one example can be operably arranged between the different sections 10-1, 10-2, etc. of optical fiber 10. The different sections of optical fiber 10 can be spliced or otherwise optically connected using known optical connection techniques.

Figure 12:
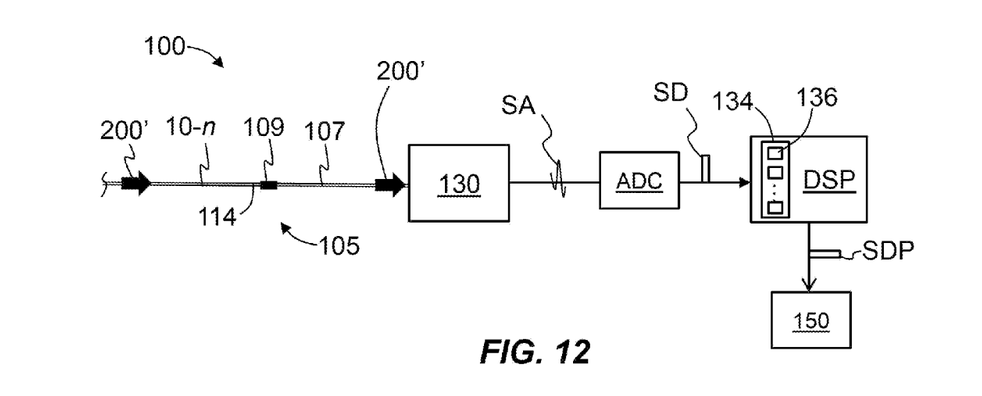
FIG. 12 is a close-up view of the back-end portion of the optical transmission system of FIG. 11, and illustrates an example configuration wherein the output end of the optical fiber link includes a short section of single-mode optical fiber.

FIG. 12 is a close-up view of the back-end portion of system 100 and illustrates an example configuration wherein optical fiber link 105 includes a short section 107 of single-mode optical fiber optically connected (e.g., via an optical connection 109, such as a splice) to the output end 14 of optical fiber section 10-n. In other embodiments, short sections 107 of single-mode optical fibers can be arranged between the sections 10-1, 10-2, . . . 10-n of optical fiber 10 and amplifiers 160.

With reference to FIGS. 10 through 12, in the operation of system 100, transmitter 110 generates light 200 that defines an input analog optical signal OS that carries information only in the fundamental mode $LP_{01}$. Light 200 enters the input end 112 of the first section 10-1 of QSM optical fiber 10 and travels the length of optical fiber link 105 to the output end 114 of the endmost QSM optical fiber 10, e.g., QSM optical fiber section 10-n and then through section 107 of single-mode fiber, as shown in FIG. 12.

Most of light 200 travels in the fundamental mode ($LP_{01}$) all the way to the output end 114. However, some of the light 200 will couple out of the fundamental mode $LP_{01}$ and into the higher order mode $LP_{11}$, travel part of the way in the higher order mode with a different group velocity from the fundamental mode, and then couple back into the fundamental mode before reaching the output end. This creates the presence of delayed copies of the signal arriving in the fundamental mode with different delays relative to the main signal, and constitutes multi-path interference which can degrade the signal quality. The light 200 is denoted as 200' at the output end of QSM optical fiber 10 due the light having impairments described above by virtue of having traveled through QSM optical fiber 10.

Optical receiver 130 receives light 200' as emitted from the output end 114 of QSM optical fiber 10 (and through section 107 of single-mode fiber, if present) and converts this light into a corresponding analog electrical signal SA. The analog electrical signal SA passes through analog-to-digital converter ADC, which forms therefrom a corresponding digital electrical signal SD. The digital electrical signal SD is then received by digital signal processor DSP, which performs digital processing of the digital electrical signal. In particular, the digital signal processor DSP is configured to perform equalization of MPI using MPI mitigation system 134 and the equalizer taps 136 therein based on techniques known in the art. The digital signal processor DSP outputs a processed digital electrical signal SDP that is representative (to within the limits of MPI mitigation system 134) of the initial optical signal OS generated by transmitter 110. The processed digital electrical signal SDP, which includes the information originally encoded into optical system OS, continues downstream to be processed as needed (e.g., by a decision circuit 150) for the given application.

As noted above, the relatively high DMA of ≥1 dB/km or ≥2 dB/km or ≥3 dB/km or ≥4 dB/km results in less complex digital signal processing, i.e., the number $N_T$ of equalizer taps 136 is reduced as compared to conventional optical transmission systems that employ MPI compensation. With reference to FIG. 9C and Table 6, for a DMA of ≥1 dB/km, the number of taps 136 required is reduced by 60%. For a DMA of ≥2 dB/km, the number of taps 136 required is reduced by 80%. For a DMA of ≥3 dB/km, the number of taps 136 required is reduced by 87%. For a DMA of ≥4 dB/km, the number of taps 136 required is reduced by 90%. The reduction in the number $N_T$ of taps is measured relative to the number of taps that would be needed if the DMA were zero, which is the case for conventional optical transmissions systems that employ MPI compensation.

Reducing the signal processing complexity generally leads to simpler hardware design, reduced power consumption, better reliability, easier maintenance, and reduced cost. Also, as noted above, high DMA values also reduce the total MPI level, which may have an upper limit in terms of the efficacy of the MPI compensation digital signal processing. Reduction of the total MPI level can enable longer system reach and higher-data-rate transmission.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical transmission system, comprising:
   a quasi-single mode (QSM) optical fiber configured to support a fundamental mode having effective area $A_{\mathit{eff}}$>170 μm² for a wavelength of 1550 nm and an attenuation of no greater than 0.2 dB/km for a wavelength of 1530 nm, and to support a single higher-order mode having a differential modal attenuation (DMA) of at least 1.0 dB/km at a wavelength of 1530 nm;
   an optical transmitter optically coupled to the QSM optical fiber and configured to emit light that defines an optical signal that carries information;
   an optical receiver optically coupled to the optical transmitter by the QSM optical fiber and configured to receive the light emitted by the optical transmitter and transmitted over the QSM optical fiber in the fundamental mode and the single higher-order mode, wherein the transmission of the optical signals over the QSM optical fiber gives rise to multipath interference (MPI), and wherein the optical receiver generates an analog electrical signal representative of the received light;
   an analog-to-digital converter (ADC) electrically connected to the optical receiver and that converts the analog electrical signal into a corresponding digital electrical signal; and
   a digital signal processor electrically connected to the ADC and configured to receive and process the digital electrical signal to mitigate the MPI and generate a processed digital signal representative of the optical signal from the optical transmitter, wherein the digital signal processor includes a number $N_T$ of filter taps, and wherein the number $N_T$ of filter taps is reduced by at least 60% as compared to if the DMA of the QSM optical fiber were equal to zero.

2. The method according to claim 1, wherein the DMA is at least 2.0 dB/km, and wherein the number $N_T$ of filter taps is reduced by at least 80%.

3. The method according to claim 1, wherein the DMA is at least 3.0 dB/km, and wherein the number $N_T$ of filter taps is reduced by at least 87%.

4. The method according to claim 1, wherein the DMA is at least 4.0 dB/km, and wherein the number $N_T$ of filter taps is reduced by at least 90%.

5. The optical transmission system according to claim 1, wherein the QSM optical fiber has a core with a radius that is greater than 5 μm.

6. The optical transmission system according to claim 1, wherein the QSM optical fiber has a core with a radius that is greater than 7 μm.

7. The optical transmission system according to claim 1, wherein the QSM optical fiber has a cutoff wavelength $\lambda c$>1600 nm.

8. The optical transmission system according to claim 1, wherein the QSM optical fiber includes a core and a cladding surrounding the core, wherein the cladding includes an inner annular cladding region of refractive index $n_2$ immediately adjacent the core, and a moat of refractive index $n_3$ immediately adjacent the inner annular cladding region, and wherein $n_2 > n_3$.

9. The optical transmission system according to claim 1, wherein the effective area $A_{eff} > 200$ μm² and wherein the QSM optical fiber has a bending loss of BL<0.02 dB/turn for a wavelength of 1625 nm and for a bend diameter $D_B = 60$ mm.

10. The optical transmission system according to claim 1, wherein attenuation of the fundamental mode is no greater than 0.17 dB/km, and wherein for the fundamental mode $LP_{01}$ the bending loss BL<0.005 dB/turn at 1625 nm for the bend diameter $D_B = 60$ mm.

11. An optical transmission system, comprising:
an optical fiber link having at least one section of quasi-single mode (QSM) optical fiber having: a core having a centerline and an outer edge, with a peak refractive index $n_0$ on the centerline and a refractive index $n_1$ at the outer edge; a cladding section surrounding the core, wherein the cladding section includes a first inner annular cladding region immediately adjacent the core; wherein the core and cladding section support a fundamental mode $LP_{01}$ and a higher-order mode $LP_{11}$ and define: i) for the fundamental mode $LP_{01}$: an effective area $A_{eff} > 170$ μm² for a wavelength of 1550 nm and an attenuation of no greater than 0.2 dB/km for a wavelength of 1530 nm; ii) for the higher-order mode $LP_{11}$: a differential modal attenuation (DMA) of at least 1.0 dB/km for the wavelength of 1530 nm; and iii) a bending loss of BL<0.02 dB/turn for a wavelength of 1625 nm and for a bend diameter $D_B = 60$ mm;
an optical transmitter configured to emit light that defines an optical signal that carries information;
an optical receiver optically coupled to the optical transmitter by the at least one section of QSM optical fiber and configured to receive the light emitted by the optical transmitter and transmitted over the QSM optical fiber in the fundamental mode $LP_{01}$ and the higher-order mode $LP_{11}$ thereby giving rise to multipath interference (MPI), wherein the optical receiver generates an analog electrical signal from the received light;
an analog-to-digital converter (ADC) electrically connected to the optical receiver and that converts the analog electrical signal into a corresponding digital electrical signal; and
a digital signal processor electrically connected to the ADC and configured to receive and process the digital electrical signal to mitigate the MPI and generate a processed digital signal representative of the optical signal from the optical transmitter, wherein the digital signal processor includes a number $N_T$ of filter taps, and wherein the number $N_T$ of filter taps is reduced by at least 60% as compared to if the DMA of the QSM optical fiber were equal to zero.

12. The method according to claim 11, wherein the DMA is at least 2.0 dB/km, and wherein the number $N_T$ of filter taps is reduced by at least 80%.

13. The method according to claim 11, wherein the DMA is at least 3.0 dB/km, and wherein the number $N_T$ of filter taps is reduced by at least 87%.

14. The method according to claim 11, wherein the DMA is at least 4.0 dB/km, and wherein the number $N_T$ of filter taps is reduced by at least 90%.

15. The method according to claim 11, wherein the effective area $A_{eff} > 200$ μm².

16. An optical transmission method, comprising:
transmitting optical signals over an optical fiber link having at least one section of quasi-single mode (QSM) optical fiber configured to support a fundamental mode having an effective area $A_{eff} > 170$ μm² for a wavelength of 1550 nm and an attenuation of no greater than 0.2 dB/km for a wavelength of 1530 nm, and to support a single higher-order mode having a differential modal attenuation (DMA) of at least 1.0 dB/km at a wavelength of 1530 nm, wherein the transmitting of the optical signals gives rise to multipath interference (MPI);
receiving the transmitted optical signals with an optical receiver and generating in response analog electrical signals representative of the optical signals and including the MPI;
converting the analog electrical signals to digital electrical signals; and
processing the digital electrical signals with a digital signal processor that includes a number $N_T$ of filter taps configured to mitigate the MPI, wherein the number $N_T$ of filter taps is reduced by at least 60% as compared to if the DMA were zero.

17. The method according to claim 16, wherein the DMA is at least 2.0 dB/km, and wherein the number $N_T$ of filter taps is reduced by at least 80%.

18. The method according to claim 16, wherein the DMA is at least 3.0 dB/km, and wherein the number $N_T$ of filter taps is reduced by at least 87%.

19. The method according to claim 16, wherein the DMA is at least 4.0 dB/km, and wherein the number $N_T$ of filter taps is reduced by at least 90%.

20. The method according to claim 16, wherein the effective area $A_{eff} > 200$ μm².

* * * * *